US008291190B2

(12) United States Patent
Watanabe et al.

(10) Patent No.: US 8,291,190 B2
(45) Date of Patent: Oct. 16, 2012

(54) DISK DRIVE INCLUDING A HOST INTERFACE SUPPORTING DIFFERENT SIZES OF DATA SECTORS AND METHOD FOR WRITING DATA THERETO

(75) Inventors: Yoshiju Watanabe, Kanagawa (JP); Toshio Kakihara, Kanagawa (JP); Koichi Arai, Kanagawa (JP); Terumi Takashi, Kanagawa (JP); Yuzo Nakagawa, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 103 days.

(21) Appl. No.: 12/545,788

(22) Filed: Aug. 21, 2009

(65) Prior Publication Data
US 2011/0072232 A1    Mar. 24, 2011

(30) Foreign Application Priority Data
Aug. 23, 2008    (JP) .................................. 2008-214742

(51) Int. Cl.
*G06F 13/00*    (2006.01)
*G06F 13/28*    (2006.01)
(52) U.S. Cl. . 711/172; 711/155; 711/162; 711/E12.002; 711/E12.103
(58) Field of Classification Search ........................ None
See application file for complete search history.

(56) References Cited

U.S. PATENT DOCUMENTS

| 6,295,176 | B1 * | 9/2001 | Reddy et al. ..................... 360/48 |
| 7,080,200 | B2 | 7/2006 | Hassner et al. |
| 7,212,363 | B2 | 5/2007 | Nagasaka |
| 2004/0088479 | A1 | 5/2004 | Hall |
| 2006/0036817 | A1 * | 2/2006 | Oza et al. ....................... 711/155 |
| 2009/0150614 | A1 * | 6/2009 | Auerbach et al. .............. 711/118 |
| 2010/0195538 | A1 * | 8/2010 | Merkey et al. ................. 370/255 |

FOREIGN PATENT DOCUMENTS

| JP | 2001202200 | 7/2001 |
| JP | 2002015507 | 1/2002 |

* cited by examiner

*Primary Examiner* — Kevin Verbrugge
*Assistant Examiner* — Eric S Cardwell

(57) ABSTRACT

A method for writing data to a disk drive. The method includes: receiving a write command; and, determining whether a beginning and an end of a rewrite area specified by the write command agree with boundaries of large-sized data sectors on a disk. The method also includes: reading head and tail data sectors and making a backup of the head and tail data sectors in first and second non-volatile memory areas, respectively, if the beginning of the rewrite area does not agree with the boundaries. The method includes starting a rewrite of the rewrite area after completing backups into first and second non-volatile memory areas. Moreover, the method includes: determining a state stage by using data in first, second, third and fourth non-volatile memory areas if a power shut-down occurs during execution of the write command; and, executing a recovery process in accordance with the determined state stage.

16 Claims, 9 Drawing Sheets

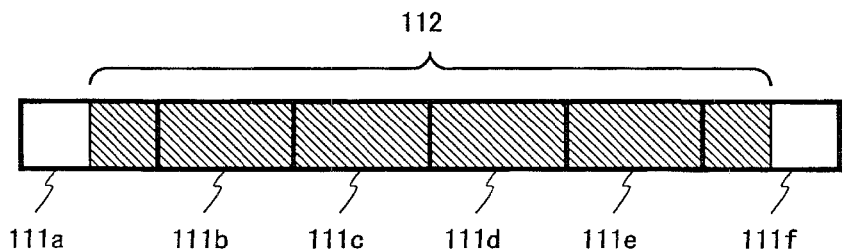
FIG. 4
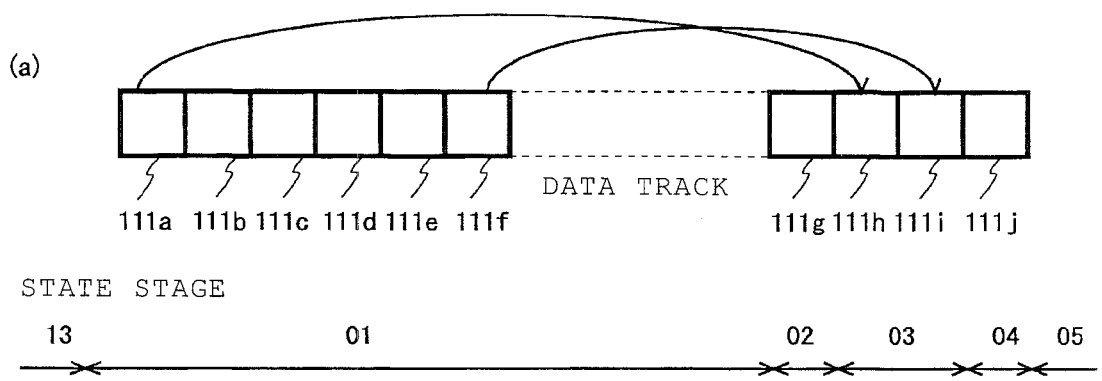
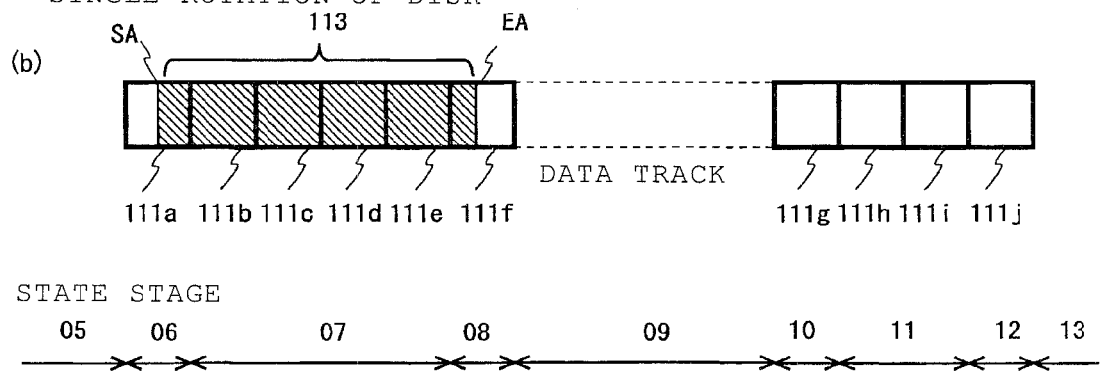
FIG. 5

| | POWER FLAG | HEAD SECTOR | END SECTOR | START FLAG | END FLAG | OPERATION |
|---|---|---|---|---|---|---|
| 00 | SAFE | RIGHT | RIGHT | COMPLETION | COMPLETION | NONE (NORMAL STATE) |
| 01 | FAIL | PREVIOUS | PREVIOUS | COMPLETION | COMPLETION | SET FLAG OF STAGE 00 (REWRITE UNCOMPLETED) |
| 02 | FAIL | PREVIOUS | PREVIOUS | × | COMPLETION | SET FLAG OF STAGE 00 (REWRITE UNCOMPLETED) |
| 03 | FAIL | PREVIOUS | PREVIOUS | EXECUTION | COMPLETION | SET FLAG OF STAGE 00 (REWRITE UNCOMPLETED) |
| 04 | FAIL | PREVIOUS | PREVIOUS | EXECUTION | × | SET FLAG OF STAGE 00 (REWRITE UNCOMPLETED) |
| 05 | FAIL | PREVIOUS | PREVIOUS | EXECUTION | EXECUTION | SET FLAG OF STAGE 00 (REWRITE UNCOMPLETED) |
| 06 | FAIL | × | PREVIOUS | EXECUTION | EXECUTION | WRITE BACK DATA, SET FLAG OF STAGE 00 |
| 07 | FAIL | RENEW | PREVIOUS | EXECUTION | EXECUTION | WRITE BACK DATA, SET FLAG OF STAGE 00 |
| 08 | FAIL | RENEW | × | EXECUTION | EXECUTION | WRITE BACK DATA, SET FLAG OF STAGE 00 |
| 09 | FAIL | RENEW | RENEW | EXECUTION | EXECUTION | SET FLAG OF STAGE 00 (REWRITE COMPLETED) |
| 10 | FAIL | RENEW | RENEW | EXECUTION | EXECUTION | SET FLAG OF STAGE 00 (REWRITE COMPLETED) |
| 11 | FAIL | RENEW | RENEW | COMPLETION | EXECUTION | SET FLAG OF STAGE 00 (REWRITE COMPLETED) |
| 12 | FAIL | RENEW | RENEW | COMPLETION | × | SET FLAG OF STAGE 00 (REWRITE COMPLETED) |
| 13 | FAIL | RENEW | RENEW | COMPLETION | COMPLETION | SET FLAG OF STAGE 00 (REWRITE COMPLETED) |

FIG. 8

DISK DRIVE INCLUDING A HOST INTERFACE SUPPORTING DIFFERENT SIZES OF DATA SECTORS AND METHOD FOR WRITING DATA THERETO

CROSS-REFERENCE TO RELATED APPLICATION

This application claims priority from the Japanese Patent Application No. 2008-214742, filed Aug. 23, 2008, the disclosure of which is incorporated herein in its entirety by reference.

TECHNICAL FIELD

Embodiments of the present invention relate to disk drives and methods for writing data to the disk drive.

BACKGROUND

Disk drives using various kinds of disks, such as optical disks, magneto-optical disks, flexible magnetic-recording disks, and similar information-storage disks are known in the art. In particular, hard disk drives (HDDs) have been widely used as information-storage devices that are indispensable for contemporary computer systems. Moreover, HDDs have found widespread application to motion picture recording and reproducing apparatuses, car navigation systems, cellular phones, and similar devices, in addition to computers, because of the outstanding information-storage characteristics of HDDs.

Magnetic-recording disks used in HDDs have multiple concentric data tracks and servo tracks. Each servo track includes multiple servo data areas, some including address information. Each data track includes multiple data sectors including user data. Data sectors are recorded discretely in the circumferential direction between servo data areas. A magnetic-recording head of a head-slider supported by a rotary actuator accesses a desired data sector in accordance with address information provided by servo data to write data to, or read data from, the data sector. A head-slider is bonded on a suspension of the actuator. The pressure caused by air viscosity between an air bearing surface (ABS) of the head-slider facing a magnetic-recording disk and the spinning magnetic-recording disk balances the pressure applied by the suspension toward the magnetic-recording disk so that the head-slider flies above the magnetic-recording disk with a certain fly height. The actuator rotates on a pivot shaft to move the head-slider to a target data track and positions the head-slider above the track.

An HDD accesses data on a magnetic-recording disk in units of data sectors. In a typical HDD, the size of a data sector is 512 bytes. Hence, most contemporary computer programs, also referred to herein by the term of art, "hosts," are written based on the data sector size of 512 bytes. However, with the advance of software technology, the data size handled by software is increasing; consequently, the data size for the unit of access by an HDD is likely to correspondingly increase. For example, a data sector size of 4 kilobytes (4096 bytes) has been proposed. Increasing the data sector size for the unit of access reduces additional redundant data relative to data stored in a 512-byte sector that is present in addition to user data; and, consequently, increasing the data sector size is expected to increase the capacity of a recording surface of a magnetic-recording disk because of more economical use of the space for the recording of information on the recording surface.

Non-uniformity of data sector size in programs, hosts, raises the issue of adjusting the HDDs' data sector size. Even if large-sized data sectors become widely used, not all software, hosts, may readily be written based on the large-sized data sectors; and, it is expected that some software will be written based on the conventional 512-byte data sectors. In addition, users, in practice, use both new programs and old programs. Accordingly, it is desirable that HDDs support both the conventional 512-byte data sectors, as well as the new large-sized data sectors.

SUMMARY

Embodiments of the present invention include a method for writing data to a disk of a disk drive. The disk drive is configured to access the disk based on large-sized data sectors and includes a host interface configured to support both large-sized data sectors and small-sized data sectors. The method includes: receiving a write command; identifying a data sector size of the write command; and, determining whether a beginning and an end of a rewrite area specified by the write command agree with boundaries of large-sized data sectors on the disk if the data sector size of the write command is a data sector size of a small-sized data sector. The method also includes: reading a head data sector that includes the beginning of the rewrite area from the disk, and making a backup of the head data sector in a first non-volatile memory area if the beginning of the rewrite area does not agree with a boundary of a large-sized data sector on the disk; and, reading a tail data sector that includes the end of the rewrite area from the disk, and making a backup of the tail data sector in a second non-volatile memory area if the end of the rewrite area does not agree with the boundary of the large-sized data sector on the disk. In addition, the method includes: setting data in a third non-volatile memory area indicating a start of backups before starting the backups into the first non-volatile memory area and the second non-volatile memory area; setting data in a fourth non-volatile memory area indicating a completion of the backups after completing the backups into the first non-volatile memory area and the second non-volatile memory area; and, starting a rewrite of the rewrite area after completing the backups into the first non-volatile memory area and the second non-volatile memory area. Moreover, the method includes: determining a state stage by using the data in the third non-volatile memory area indicating the start of the backups, the data in the fourth non-volatile memory area indicating the completion of the backups, data in the first and the second non-volatile memory areas, and data in the head data sector and the tail data sector in the rewrite area if a power shut-down occurs during execution of a process of the write command; and, executing a recovery process in accordance with the determined state stage.

DESCRIPTION OF THE DRAWINGS

The accompanying drawings, which are incorporated in and form a part of this specification, illustrate embodiments of the invention and, together with the description, serve to explain the embodiments of the present invention:

FIG. 4 illustrates an example in which both boundaries of a start address and an end address of an address area specified by a read command do not agree with those of data sectors of a magnetic-recording disk, in accordance with an embodiment of the present invention.

FIGS. 5(a) and 5(b) are schematic diagrams depicting a write process when both boundaries of the start address and the end address of the address area specified by a write command do not agree with those of data sectors of a magnetic-recording disk, in accordance with an embodiment of the present invention.

FIG. 8 is a table exemplifying state stages in the write process including a backup process, in accordance with an embodiment of the present invention.

Figure 1:
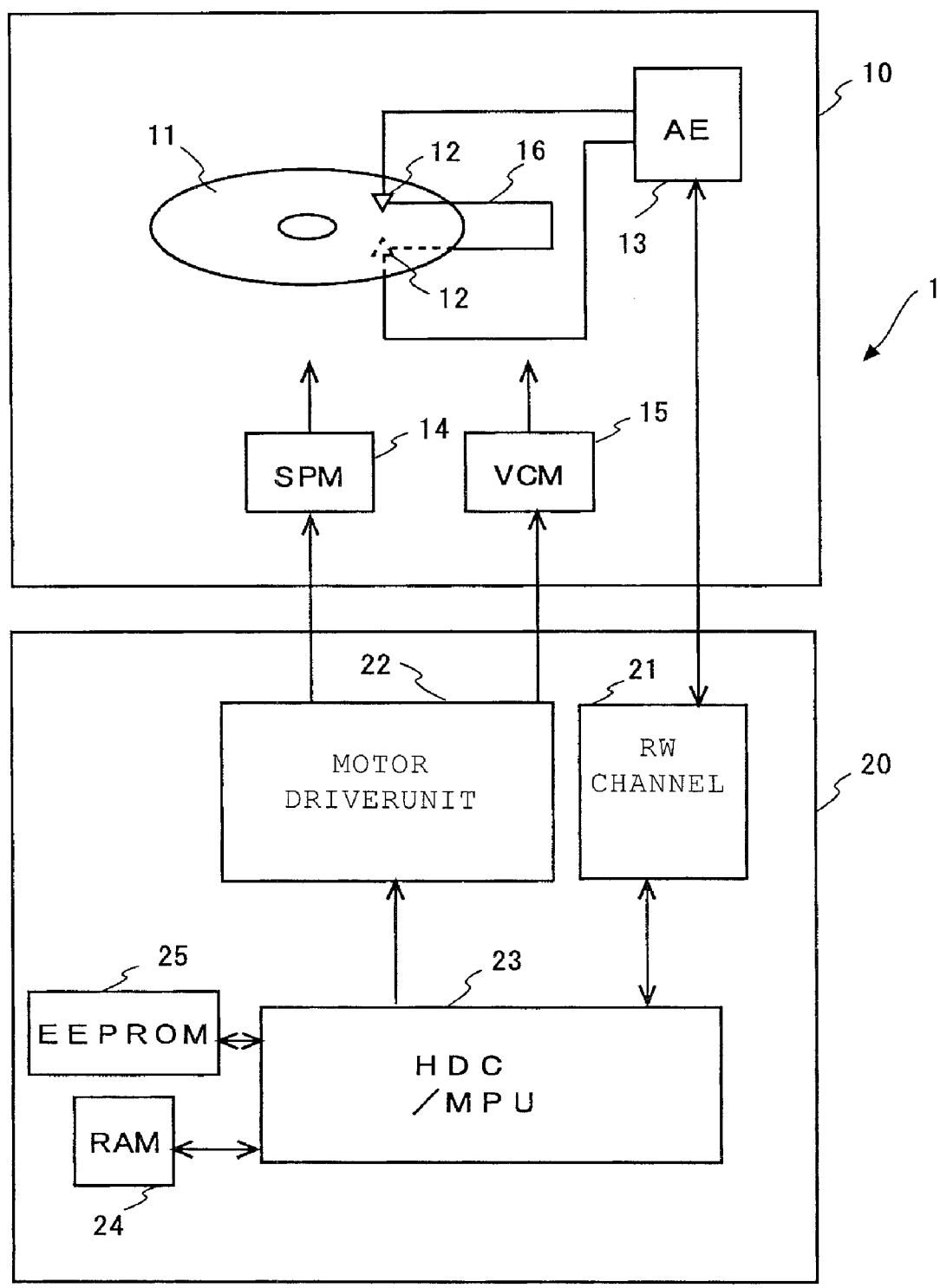
FIG. 1 is a block diagram schematically depicting the configuration of an HDD, in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

DESCRIPTION OF EMBODIMENTS OF THE PRESENT INVENTION FOR A DISK DRIVE INCLUDING A HOST INTERFACE SUPPORTING DIFFERENT SIZES OF DATA SECTORS AND A METHOD FOR WRITING DATA TO THE DISK DRIVE

Figure 10:
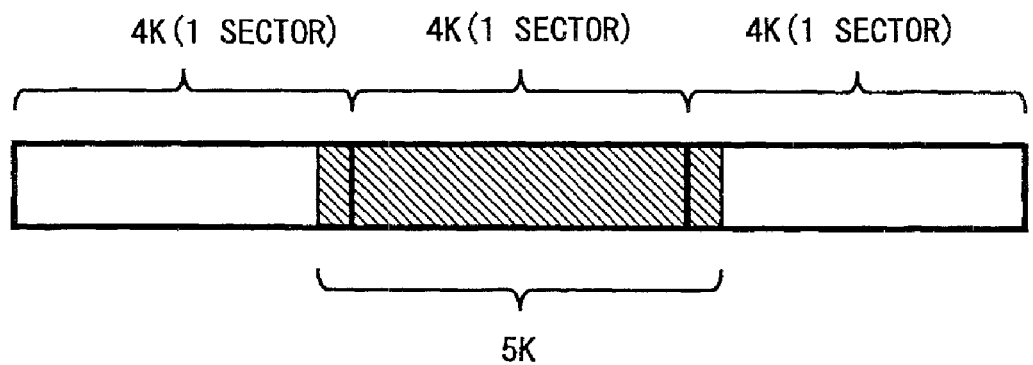
FIG. 10 is a diagram schematically depicting an example of data sectors and a rewrite area in an HDD which supports differently sized data sectors in accordance with conventional art.

In accordance with embodiments of the conventional art, the boundary addresses of data, which determine the size of the access area, specified in units of 512 bytes may not agree with the boundary addresses in 4 KB. FIG. 10 shows an example of three 4 KB data sectors and an area specified by a command in 512-byte sectors. The area specified by the command is 5 KB; and, neither the start address, nor the end address, agrees with the boundary addresses in 4 KB data sectors. In such a case, the HDD accesses all of the three 4 KB data sectors which overlap the specified address area. In other words, the HDD accesses data sectors that are only partially included in the area of the address area specified by the command, which are referred to herein by the terms of art, "head data sector," and "end data sector," respectively, as well as the data sector that in whole is included in the area specified by the command, which is referred to herein by the terms of art, "the middle data sector." Specifically, in a read process, an HDD retrieves all data sectors containing data at the specified address area from a magnetic-recording disk into a buffer. Portions of data sectors include data other than those at the address area specified by a host. Hence, the HDD extracts data from the data retrieved from the magnetic-recording disk and transfers the extracted data to the host. In a write process, the HDD retrieves a data sector a portion of which is included in the specified address area, creates new sector data from a portion of the retrieved data sector and the data obtained from the host, and writes the data into the data sector of the magnetic-recording disk.

In the middle of writing data to a magnetic-recording disk following a write command, an accidental power shut-down may occur. Under such circumstances, the latest user data may not be stored to the data sectors in the rewrite area specified by the command so that a portion, or all, of the user data obtained from the host may be lost. The data sectors that become errors, however, are the data sectors at the address area specified by the host's write command; and, the data likely to be lost are the user data targeted by the write command. Designers can design software, hosts, considering this possibility; if the software is designed to deal with this circumstance, the data loss can be dealt with in some acceptable manner.

If the data sector size in the interface to a host is different from the data sector size in accessing a magnetic-recording disk within an HDD, however, a power shut-down in a write process raises another issue. As described above, if the read from, or the write to, a magnetic-recording disk is based on the large-sized data sectors of 4 KB and the interface to the host is based on the small-sized data sectors of 512 bytes, in a write process, only a portion of data may be rewritten to the head and the end data sectors in the rewrite area on the magnetic-recording disk. If a power shut-down happens in writing the head or the end data sector, data that is not targeted to be rewritten will be lost. Namely, user data different from user data of the on-going write command will be lost. The lost user data is user data of the program, host, which issued the write command, or user data of another program, another host. In either case, this user data loss is data loss which is not expected by the host that issued the write command, or by the host that is the lost data's owner. Accordingly, in accordance with embodiments of the present invention, a method to prevent such data loss may be implemented in HDDs. Moreover, embodiments of the present invention include methods for preventing the data loss with efficiency and reliability.

In accordance with an embodiment of the present invention, a method for writing data to a disk of a disk drive that is configured to access the disk based on large-sized data sectors and that includes the host interface configured to support both large-sized data sectors and small-sized data sectors includes: receiving a write command, identifying a data sector size of the write command, and determining whether, or not, a beginning and an end of a rewrite area specified by the write command agree with boundaries of large-sized data sectors on the disk if the data sector size of the write command is a data sector size of a small-sized data sector. The method also includes: reading a head data sector which includes the beginning of the rewrite area from the disk, and making a backup of the head data sector in a first non-volatile memory area if the beginning of the rewrite area does not agree with a boundary of a large-sized data sector on the disk; and, reading a tail data sector that includes the end of the rewrite area from the disk, and making a backup of the tail data sector in a second non-volatile memory area if the end of the rewrite area does not agree with the boundary of the large-sized data sector on the disk. In addition, the method includes: setting data in a third non-volatile memory area indicating the start of the backups before starting the backups into the first non-volatile memory area and the second non-volatile memory area; setting data in a fourth non-volatile memory area indicating the completion of the backups after completing the backups into the first non-volatile memory area and the second non-volatile memory area; and, starting a rewrite of the rewrite area after completing the backups into the first non-volatile memory area and the second non-volatile memory area. Moreover, the method includes: determining a state stage by using the data in the third non-volatile memory area indicating the start of the backups, the data in the fourth non-volatile memory area indicating the completion of the backups, data in the first and the second non-volatile memory areas, and data in the head data sector and the tail data sector in the rewrite area if a power shut-down occurs during execution of a process of the write command; and, executing a recovery process in accordance with the determined state stage. Thus, in a disk drive including a host interface supporting different sizes of data sectors, data outside the data rewrite area is prevented from being lost at a power-shut down in a write process.

In one embodiment of the present invention, the method further includes changing the data indicating the start of the backups and the completion of the backups so as to indicate completion of the rewrite in the rewrite area after the completion of the rewrite. Thus, flags indicating the states of rewrite and backup can be shared, which accomplishes efficient processing.

In another embodiment of the present invention, the first, the second, the third and the fourth non-volatile memory areas may be areas selected from the group consisting of areas on the magnetic-recording disk and areas in a semiconductor non-volatile memory.

In another embodiment of the present invention, the method further includes storing the write command into a fifth non-volatile memory area, and determining a write area by referring to the stored write command in determining the state stage. Thus, information can be maintained efficiently.

In one embodiment of the present invention, the first, the second, the third and the fourth non-volatile memory areas are data sectors on a same track of the disk. In another embodiment of the present invention, the first, the second, the third and the fourth non-volatile memory areas and the rewrite area are data sectors on the same track of the disk. Moreover, in another embodiment of the present invention, the data indicating the start of the backup, the data in the first non-volatile memory area, the data in the second non-volatile memory area, and the data indicating the completion of the backup are sequentially stored into data sectors in order of: first, the data indicating the start of the backup; second, the data in the first non-volatile memory areas; third, the data in the second non-volatile memory area; and fourth, the data indicating the completion of the backup. In another embodiment of the present invention, the data sectors for storing the data indicating the start of the backup, the data in the first non-volatile memory area, the data in the second non-volatile memory area, and the data indicating the completion of the backup are consecutive. According to these embodiments of the present invention, if the first, the second, the third and the fourth non-volatile memory areas are areas on the disk, processing time can be shortened.

In accordance with an embodiment of the present invention, a disk drive that is configured to access a disk based on the large-sized data sectors and that includes a host interface configured to support both large-sized data sectors and small-sized data sectors includes: a data size detector configured to receive a write command and to detect the data sector size of the write command; and, a determining part configured to determine whether, or not, a beginning and an end of a rewrite area specified by the write command agree with boundaries of large-sized data sectors on the disk if the data sector size of the write command is a data sector size of a small-sized data sector. The disk drive also includes: a first non-volatile memory area configured to make a backup of a head data sector that includes the beginning of the rewrite area read from the disk, if the beginning of a rewrite area does not agree with a boundary of a large-sized data sector on the disk; a second non-volatile memory area configured to make a backup of the tail data sector that includes the end of the rewrite area read from the disk, if the end of a rewrite area does not agree with the boundary of large-sized data sector on the disk; a third non-volatile memory area configured to set data indicating the start of the backups before starting the backups into the first non-volatile memory area and the second non-volatile memory area; and, a fourth non-volatile memory area configured to set data indicating a completion of the backups after completing the backups into the first non-volatile memory area and the second non-volatile memory area. In addition, the disk drive includes: a head configured to start a rewrite of the rewrite area after completion of the backups into the first non-volatile memory area and the second non-volatile memory area; and, a recovery processor configured to determine a state stage by using the data in the third non-volatile memory area indicating the start of the backups, the data in the fourth non-volatile memory area indicating the completion of the backups, data in the first and the second non-volatile memory areas and data in the head data sector and the tail data sector in the rewrite area if a power shut-down occurs during execution of a process of the write command, and configured to execute a recovery process in accordance with the determined state stage. Thus, in a disk drive including a host interface supporting different sizes of data sectors, data outside the data rewrite area is prevented from being lost at a power-shut down in a write process.

In accordance with embodiments of the present invention, in a disk drive including a host interface supporting different sizes of data sectors, when a power shut-down happens in a write process, data in the area other than the data rewrite area can be prevented from being lost. Subsequently, an embodiment of the present invention is described, by way of example without limitation thereto, as a HDD, as an example of a disk drive. In accordance with embodiments of the present invention, a HDD supports both large sized data sectors and small sized data sectors through a host interface. Namely, a host can issue read and write commands to the HDD in both the large-sized data sectors and the small-sized data sectors. For example, the size of a small data sector may be 512 bytes, and the size of a large data sector may be 4 kilobytes, which is 4096 bytes. The data sectors on a magnetic-recording disk are large-sized data sectors. The HDD accesses, which reads data from, or writes data to, a magnetic-recording disk based on large-sized data sectors for all reading and writing operations to the magnetic-recording disk. Such large data sectors on a magnetic-recording disk reduce redundant data for each data sector that otherwise would be present in the case of small data sectors to increase the data capacity of the recording surface of the magnetic-recording disk. When the HDD of the present embodiment receives a write command based-on small-sized data sectors from a host and if the boundaries of the specified address area, which is rewrite area, do not agree with the boundaries of large-sized data sectors on the magnetic-recording disk, the HDD backs up user data. Thus, even if an accidental power shut-down occurs during the writing operation, user data, which is not associated with the write command and is outside of the rewrite area, is prevented from being lost. In accordance with embodiments of the present invention, the method includes this data backup process. Before describing the write process of an embodiment of the present invention in detail, the configuration of the HDD is next described.

With reference now to FIG. 1, in accordance with an embodiment of the present invention, a block diagram schematically depicting the configuration of an HDD is shown. The HDD 1 includes a magnetic-recording disk 11, which is a disk for storing data, inside a disk enclosure (DE) 10. The HDD 1 also includes a spindle motor (SPM) 14 that spins the magnetic-recording disk 11 at a specific angular rate of rotation. Head-sliders 12 are provided to access the magnetic-recording disk 11; each of head-sliders 12 corresponds to each recording surface of the magnetic-recording disk 11. As used herein, "access" is a term of art that refers to reading data from, or writing data to, the magnetic-recording disk 11. Each head-slider 12 includes a slider for flying over the magnetic-recording disk and a magnetic-recording head affixed to the slider for converting magnetic signals to and from electric signals. Each head-slider 12 is affixed to the distal end of an actuator 16. The actuator 16, which is coupled to a voice coil motor (VCM) 15, rotates on a pivot shaft to move the head-sliders 12 above a spinning magnetic-recording disk 11 in nominally a radial direction of the magnetic-recording disk 11. The actuator 16 and the VCM 15 are mechanisms for providing motion of the head-sliders 12 in accessing the magnetic-recording disk 11.

With further reference to FIG. 1, in accordance with an embodiment of the present invention, circuit elements are mounted on a circuit board 20 fixed outside the DE 10. A motor driver unit 22 drives the SPM 14 and the VCM 15 in response to control data sent from a head-disk controller/microprocessor unit (HDC/MPU) 23. A RAM 24 functions as a buffer for temporarily storing data read from, and data written to, the magnetic-recording disk 11. An EEPROM 25 stores control data, or user data. An arm-electronics (AE) module 13 inside the DE 10 selects a head-slider 12 to access the magnetic-recording disk 11 out of the multiple head-sliders 12, amplifies read signals from the magnetic-recording head, and sends the read signals to a read-write channel (RW channel) 21. Embodiments of the present invention may be applied to a HDD with a single head-slider 12. The RW channel 21, in a read operation, amplifies read signals supplied from the AE module 13 to have specified amplitudes, extracts data from the obtained read signals, and decodes the data. The retrieved data includes user data and servo data. The decoded user data that is read and servo data are supplied to the HDC/MPU 23. The RW channel 21, in a write operation, code-modulates write data supplied from the HDC/MPU 23, converts the code-modulated data into write signals, and then supplies the write signals to the AE module 13.

With further reference to FIG. 1, in accordance with an embodiment of the present invention, the HDC/MPU 23, a controller, controls the HDD 1 in addition to providing data processing such as reading and writing operation control, command execution order management, positioning control of the head-sliders 12 using servo signals, referred to by the term of art, "servo control," interface control to and from a host 51, defect management, and error handling when any error occurs. In accordance with embodiments of the present invention, the host interface included in the HDC/MPU 23 of the HDD 1 supports both small-sized data sectors and large-sized data sectors. In accordance with embodiments of the present invention, the magnetic-recording disk 11 stores data in large-sized data sectors. When a command from a host 51 specifies an address area in large-sized data sectors, the HDD 1 may read data from, or write data to, the magnetic-recording disk 11 according to usual process flows. However, in accordance with embodiments of the present invention, when a command from the host 51 requests an access based on the small-sized data sectors, the HDD 1 emulates the access of small-sized data sectors in accessing the magnetic-recording disk 11.

Figure 2:
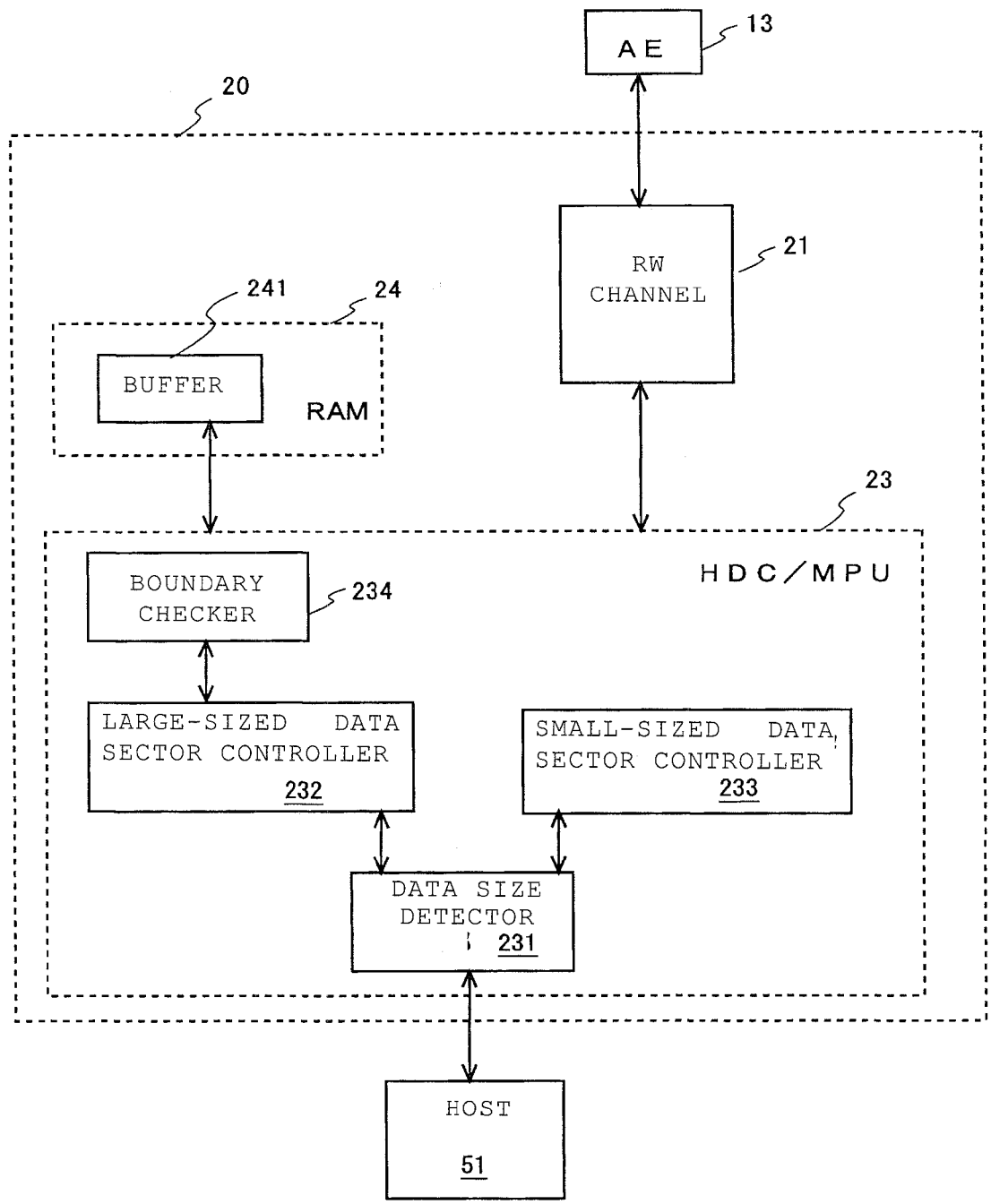
FIG. 2 is a block diagram schematically depicting the logical configuration for performing a reading, or writing, process based on different data sector sizes in the present embodiment, in accordance with an embodiment of the present invention.
Figure 3:
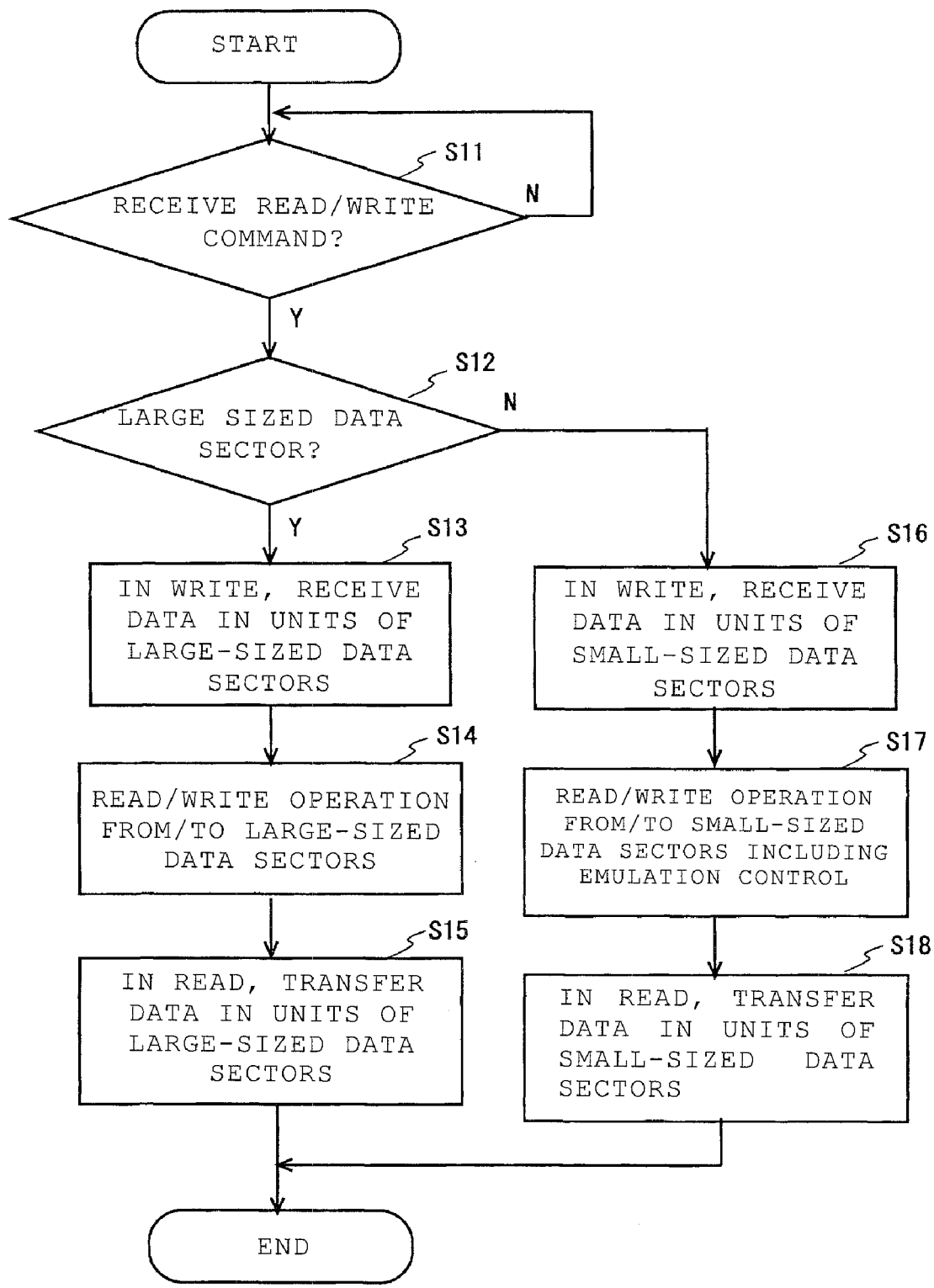
FIG. 3 is a flowchart depicting the reading, or writing, process based on different data sector sizes, in accordance with an embodiment of the present invention.

With reference now to FIGS. 2 and 3, in accordance with an embodiment of the present invention, a data backup process in a write process based on small-sized data sectors is described. First, the flow of a reading, or writing, process for different data sector sizes will be described referring to the block diagram of FIG. 2 and the flowchart of FIG. 3. FIG. 2 is a block diagram which schematically depicts the logical configuration for performing processes depending on the data sector size. The host interface and access to the magnetic-recording disk 11 are controlled by the HDC/MPU 23. The HDC/MPU 23 includes a data size detector 231, a large-sized data sector controller 232, a small-sized data sector controller 233, and a boundary checker 234. The HDC/MPU 23 includes a HDC as hardware and a MPU, and the above-described functional components are implemented by operation of the hardware or the MPU according to firmware. Accordingly, these functional components may be included in circuits other than the HDC/MPU 23, or the HDC/MPU 23 may operate these functional components on other occasions.

With further reference to FIGS. 2 and 3, in accordance with an embodiment of the present invention, at S11, upon receipt of a command from the host 51 (Y-branch after S11), at S12, the data size detector 231 identifies the data sector size of the data handled by the command. Typically, a command has a field for storing information indicating the data sector to be used and the data size detector 231 refers to the field to detect the data sector size on which the command is based. If the detected data sector size is large (Y-branch after S12), the large-sized data sector controller 232 performs a reading, or writing, of user data. Since the data sector size specified by the command is the same as the data sector size of the magnetic-recording disk, processing by the large-sized data sector controller 232 is the same as processing, business-as-usual, in a HDD. In a write process, at S13, the large-sized data sector controller 232 receives user data in units of large-sized data sectors from the host 51 and stores them in a buffer 241. Then, the large-sized data sector controller 232 transfers the data from the buffer 241 to the RW channel 21 in units of large-sized data sectors. The transferred data sectors are written to the magnetic-recording disk 11 with a head-slider 12 through the RW channel 21 and the AE module 13. At S14, the RW channel 21, the actuator 16, and the AE module 13 are controlled by the large-sized data sector controller 232.

With further reference to FIGS. 2 and 3, in accordance with an embodiment of the present invention, in a read process, at S14, the large-sized data sector controller 232 controls the RW channel 21, the actuator 16, and the AE module 13 to read data sectors at the address specified by the command from the magnetic-recording disk 11, and stores them into the buffer 241. At S15, the large-sized data sector controller 232 transfers the read data sectors from the buffer 241 to the host 51. If the detected data sector size is small (N-branch after S12), the small-sized data sector controller 233 executes a reading, or writing, of user data. In a write process, at S16, the small-sized data sector controller 233 receives user data from the host 51 in units of small-sized data and stores them into the buffer 241. Then, at S17, the small-sized data sector controller 233 executes a data write to the magnetic-recording disk 11, including emulation control of small-sized data sectors. This method is subsequently described in greater detail. In a read process, at S17, the small-sized data sector controller 233 controls the RW channel 21, the actuator 16, and the AE module 13 to read data sectors at the address specified by the command from the magnetic-recording disk 11, and stores the data sectors into the buffer 241. The read from the magnetic-recording disk 11 includes emulation control of small-sized data sectors. This method is subsequently described in greater detail. Then, at S18, the small-sized data sector controller 233 transfers the data read from the buffer 241 in units of small-sized data sectors to the host 51.

With reference now to FIG. 4, in accordance with an embodiment of the present invention, data retrieval from the magnetic-recording disk 11 in small-sized data sectors is next described. If the size of data sectors in a host interface is different from the size of data sectors on the magnetic-recording disk 11, the boundaries of the address area specified by a command from the host do not agree with boundaries of data sectors on the magnetic-recording disk 11. Therefore, the small-sized data sector controller 233 retrieves data at the addresses other than the data at the address area specified by the read command from the magnetic-recording disk 11. FIG. 4 shows an example in which both of the boundaries of the start address and the end address of the address area specified by a read command do not agree with those of data sectors on the magnetic-recording disk 11. The data sectors in a read area 112 on the magnetic-recording disk are six large-sized data sectors 111a to 111f and the read area 112 specified by the command occupies the whole area of the four middle data sectors 111b to 111e and respective partial areas of the head data sector 111a and the end data sector 111f. The small-sized data sector controller 233 ascertains the addresses of the data sectors in units of large-sized data sectors from the addresses specified by a read command in units of small-sized data sectors, reads the corresponding data sectors 111a to 111f from the magnetic-recording disk 11, and stores them into the buffer 241. In addition, the small-sized data sector controller 233 extracts data from the retrieved data and transfers the data to the host 51 in units of small-sized data sectors.

With reference now to FIG. 5, in accordance with an embodiment of the present invention, a data write to the magnetic-recording disk 11 is described. FIG. 5 shows an example in which both the boundaries of the start address and the end address of the address area specified by a write command do not agree with those of data sectors on the magnetic-recording disk 11. The data sectors in a rewrite area 113 on the magnetic-recording disk are six large-sized data sectors 111a to 111f and the area 113 specified by the command occupies the whole area of the four middle data sectors 111b to 111e and respective partial areas of the head data sector 111a and the end data sector 111f. The small-sized data sector controller 233, in a write process, writes data obtained from the host 51 to the magnetic-recording disk 11 and backs up data. FIG. 5 shows an example of making a backup to a magnetic-recording disk 11, which is an example non-volatile memory. The data to be backed up are large-sized data sectors, which are partially occupied by data specified by the host. Namely, the large-sized data sectors are the data sectors 111a and 111f; the boundaries, which are provided by the start address (SA) and the end address (EA), of the address of the area specified by the host are located at the middle of data sectors, which is located at an address position other than the start address and the end address of a data sector, respectively.

With further reference to FIG. 5, in accordance with an embodiment of the present invention, such data sectors contain user data outside the rewrite area specified by the write command, which is data irrelevant to the write command. Accordingly, making a backup of data sectors whose boundaries do not agree with the boundaries of the data sectors in the area specified by the host provides protection of the user data in the area which is not specified by the write command to rewrite, even in the event that a power shut-down occurs during a data write to the magnetic-recording disk 11. The small-sized data sector controller 233, in a backup process of user data, writes a state flag, which is the data indicating the stage of the process, onto the disk. This enables determination of the state at a power shut-down and correct recovery of data. The small-sized data sector controller 233 uses two flags: a backup start flag, and a backup end flag. As shown in FIG. 5, the small-sized data sector controller 233 sets the backup start flag before starting a write operation into backup data sectors 111h and 111i, which are a first non-volatile memory area and a second non-volatile memory area, respectively, and sets the backup end flag, after ending the write operation. In an embodiment of the present invention, as shown in FIG. 5, the backup data are written to the track on which the data sectors to be backed up exist. Thus, the seek time in seeking another data track can be avoided; and, the backup can be made efficiently. Data tracks have backup areas other than normal user data memory areas. Although processing efficiency decreases, a backup area may be provided in every zone.

Figure 6:
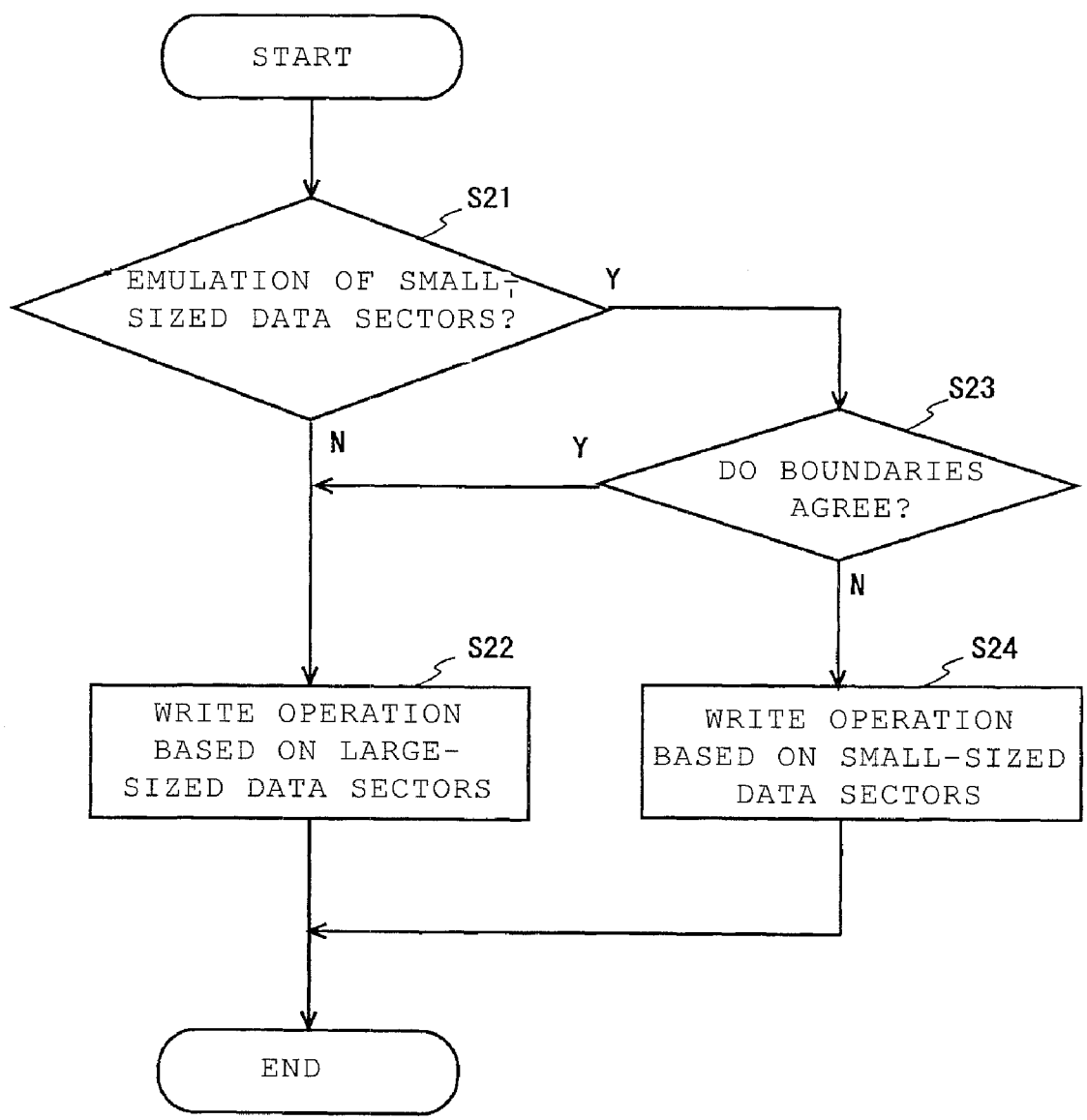
FIG. 6 is a flowchart depicting a write process including a backup process, in accordance with an embodiment of the present invention.
Figure 7:
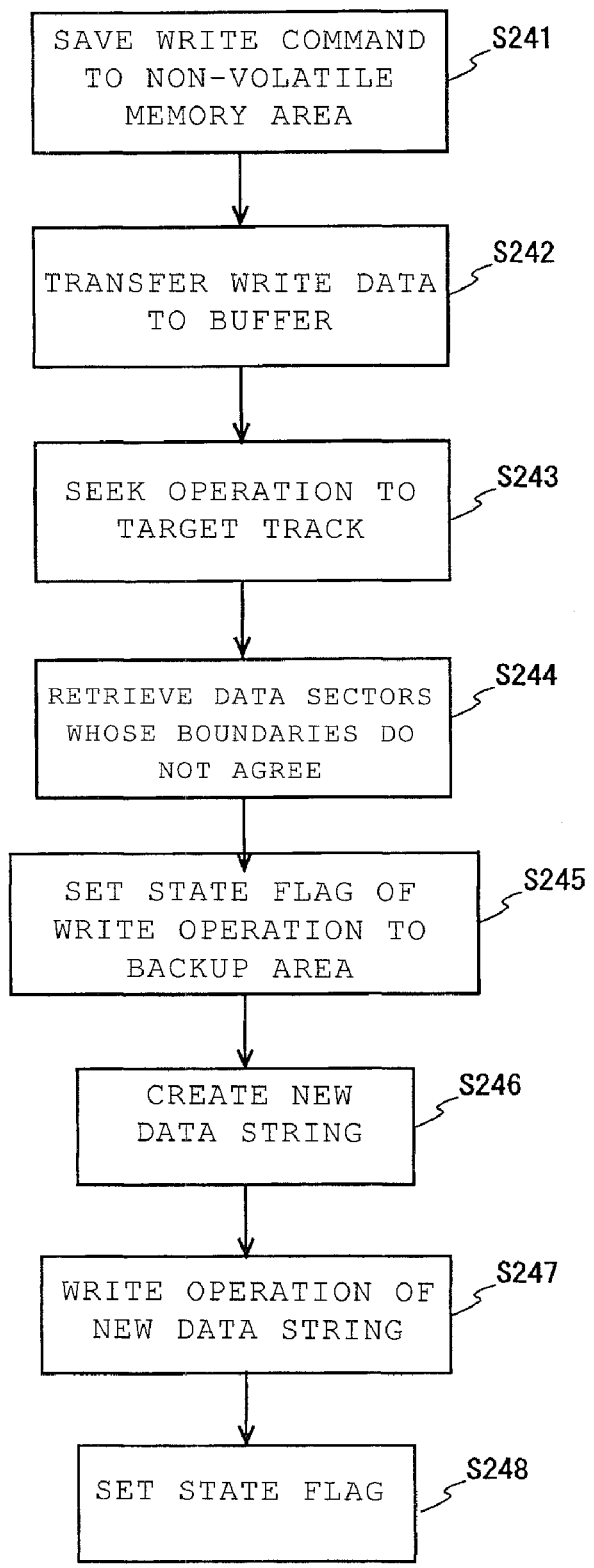
FIG. 7 is a flowchart depicting the write process including a backup process, in accordance with an embodiment of the present invention.

With reference now to FIGS. 6 and 7, in accordance with an embodiment of the present invention, the flowcharts of the write process including a backup process are next described. At S21, upon receipt of a write command from the host 51, the data size detector 231 identifies the data sector size to determine whether or not to emulate the small-sized data sectors. If emulation is not necessary (N-branch after S21), at S22, the large-sized data sector controller 232 executes a data write operation to the magnetic-recording disk 11 based on the large-sized data sectors. If the write command specifies the address area based on the small-sized data sectors (Y-branch after S21), the small-sized data sector controller 233 writes data to the magnetic-recording disk 11 based on the small-sized data sectors. At S23, the small-sized data sector controller 233 determines whether the address boundaries of the start and the end specified by the write command agree with the address boundaries of data sectors on the magnetic-recording disk 11. If the address boundaries agree at the start and the end (Y-branch after S23), the small-sized data sector controller 233 performs a data write to the magnetic-recording disk 11 without making a backup. Specifically, the small-sized data sector controller 233 merges the small-sized data sectors into the large-sized data sectors, and like the large-sized data sector controller 232, at S22, the small-sized data sector controller 233 performs a data write operation to the magnetic-recording disk 11 based on the large-sized data sectors. If the address boundaries do not agree at either the start or the end (N-branch after S23), at S24, the small-sized data sector controller 233 performs a data write process to the magnetic-recording disk 11 including a backup process.

With further reference to FIGS. 5, 6 and 7, in accordance with an embodiment of the present invention, the process of S24 is next described. At S241, the small-sized data sector controller 233 saves the write command to a non-volatile memory area, which is a fifth non-volatile memory area. The non-volatile memory area may be selected from the group consisting of an area on the magnetic-recording disk 11 and an area in the EEPROM 25, which is mounted on the control circuit board 20. Next, at S242, the small-sized data sector controller 233 transfers the write data from the host 51 to the buffer 241, and at S243, controls the actuator 16 to perform a seek operation to the target track including the data sector containing the start address of the address specified by the write command. For the example described in the discussion of FIG. 5, the rewrite area exists on a single track. At S244, the small-sized data sector controller 233 controls the RW channel 21 to read the head data sector and the end data sector whose address boundaries do not agree with those of the write data, and stores the data in the buffer 241. As shown in FIG. 5, since the boundaries do not agree at both of the head data sector 111a and the end data sector 111f, both data sectors are read, which is next described in greater detail.

With further reference to FIGS. 5 and 7, in accordance with an embodiment of the present invention, at S245, the small-sized data sector controller 233 writes the retrieved head data sector 111a and the end data sector 111f to the backup area. At this time, the small-sized data sector controller 233 rewrites state flags of the backup area. These state flags are subsequently described. The retrieval and write for backup of the head data sector 111a and the end data sector 111f terminates within a rotation of the magnetic-recording disk 11. Next, at S246, the small-sized data sector controller 233 creates a data string to be written onto the magnetic-recording disk 11 from the write data obtained from the host 51, the head data sector 111a, and the end data sector 111f. Then, at S247, the small-sized data sector controller 233 writes the created data string to the magnetic-recording disk 11. Finally, at S248, the small-sized data sector controller 233 rewrites the state flags of the backup area to end the write process. At S247, the write of new data to the magnetic-recording disk 11 and, at S248, the rewrite of the state flags terminates within a rotation of the magnetic-recording disk 11.

With further reference to FIGS. 5(a), 5(b) and 7, in accordance with an embodiment of the present invention, FIG. 5(a) illustrates, for S244, the retrieval of the head data sector 111a and the end data sector 111f, and for S245, the write to the backup area; and, FIG. 5(b) illustrates, for S247, the write of user data to the magnetic-recording disk 11, for example, the write of new data sectors 111a to 111f, and for S248, the rewrite of the state flags. The state flags are kept in the two data sectors 111g and 111j, which are a third non-volatile memory areas and a fourth non-volatile memory area, respectively. The data sectors 111h and 111i to be backed up are disposed between the two data sectors 111g and 111j, which are a third non-volatile memory areas and a fourth non-volatile memory area, respectively. The data sector 111h stores the data of the data sector 111a before the rewrite; and, the data sector 111i stores the data of the data sector 111f before the rewrite.

With further reference to FIGS. 5 and 7, in accordance with an embodiment of the present invention, the state flag stored in the head data sector 111g is a backup start flag. The state flag to be stored in the end data sector 111j is a backup end flag. In the present example, the two state flags are one-bit data such that either 0, or 1, represents execution and either 1, or 0, represents completion, respectively, depending on the use of positive, or negative, logic. The small-sized data sector controller 233 rewrites the state flags from one state to the other. Before the start of the backup process, both of the backup start flag and the backup end flag indicate completion. In the flag rewrite operation in writing backup data of S245, the backup start flag and the backup end flag are rewritten from completion to execution. Specifically, as described above, the small-sized data sector controller 233 changes the backup start flag in the data sector 111g from completion into execution, then writes the backup data of data sectors 111a and 111f to data sectors 111h and 111i, and finally changes the backup end flag in the data sector 111j from completion into execution. In the state flag rewrite operation after a new data write of S248, the backup start flag and the backup end flag are rewritten from execution into completion. Specifically, as described above, the small-sized data sector controller 233 changes the backup start flag in the data sector 111g from execution into completion, then skips data sectors 111h and 111i, and changes the backup end flag of the data sector 111j from execution into completion.

With further reference to FIGS. 5 and 7, in accordance with an embodiment of the present invention, as understood from this process flow, the location of the data sectors to store the state flags is next described. At S245, the backup start flag is rewritten immediately before a user data write for backup; and, the backup end flag is rewritten immediately after the write operation. In an embodiment of the present invention, as shown in FIG. 5, the data sectors to store the backup data may be located between the data sectors to store the state flags and these data sectors may be consecutive. As used herein, the term of art, "consecutive," means that data sectors available for use are consecutive and defect sectors are not considered. For effective processing, in one embodiment of the present invention, the addresses of the data sectors to store backup data and the data sectors to store the state flags may be fixed regardless of the number of data sectors to be backed up. In another embodiment of the present invention, to reduce the time between the rewrite of the state flag and the write of data sectors for backup as much as possible, the data sectors of the state flags and the data sectors for backup data may be consecutive as in the example of FIG. 5. In such a case, the data sectors to store data sectors and the data sectors to store the state flags, which may be, for example, the backup end flag, are different between the case in which a single data sector is to be backed up, and the case in which two data sectors are to be backed up.

With further reference to FIG. 5, in accordance with an embodiment of the present invention, the transition of state stages in a write process accompanied by a backup process is shown. In this example, the state includes thirteen stages of 01 to 13. The write process with a backup process starts from stage 13 of the state stage, sequentially changes from 01 to 12 of the state stage, and returns to the stage 13. After that, when the HDD 1 ends its operation normally, the state changes from the stage 13 to stage 00. The HDD 1 has the stage 00 which represents a normal state, where the HDD 1 normally ends without a power shut-down. If a power shut-down happens in the middle of a write process including a backup process, the HDC/MPU 23 restores the data using the backup data. For accurate restoration, the state stage of the write process with a backup process at which the process is interrupted is kept track of.

With further reference to FIG. 8, in accordance with an embodiment of the present invention, a table indicates the state stages of 00 through 13. The stage numbers are given for convenience, by way of example without limitation thereto, as in practice, the HDC/MPU 23 does not manage the state stages according to these numbers. The difference between the stage 00 and other stages corresponds to the state which the power shut-down flag indicates. The power shut-down flag is data indicating whether the HDD 1 has normally ended the operation, or has abnormally ended the operation because of a power shut-down. Since the stage 00 is a normal state, the power shut-down flag indicates a normal operation end. In other state stages, the power shut-down flag indicates an abnormal end. The table of FIG. 8 illustrates an example in which both the head and the end data sectors are backed up similar to the example of FIG. 5.

Figure 9:
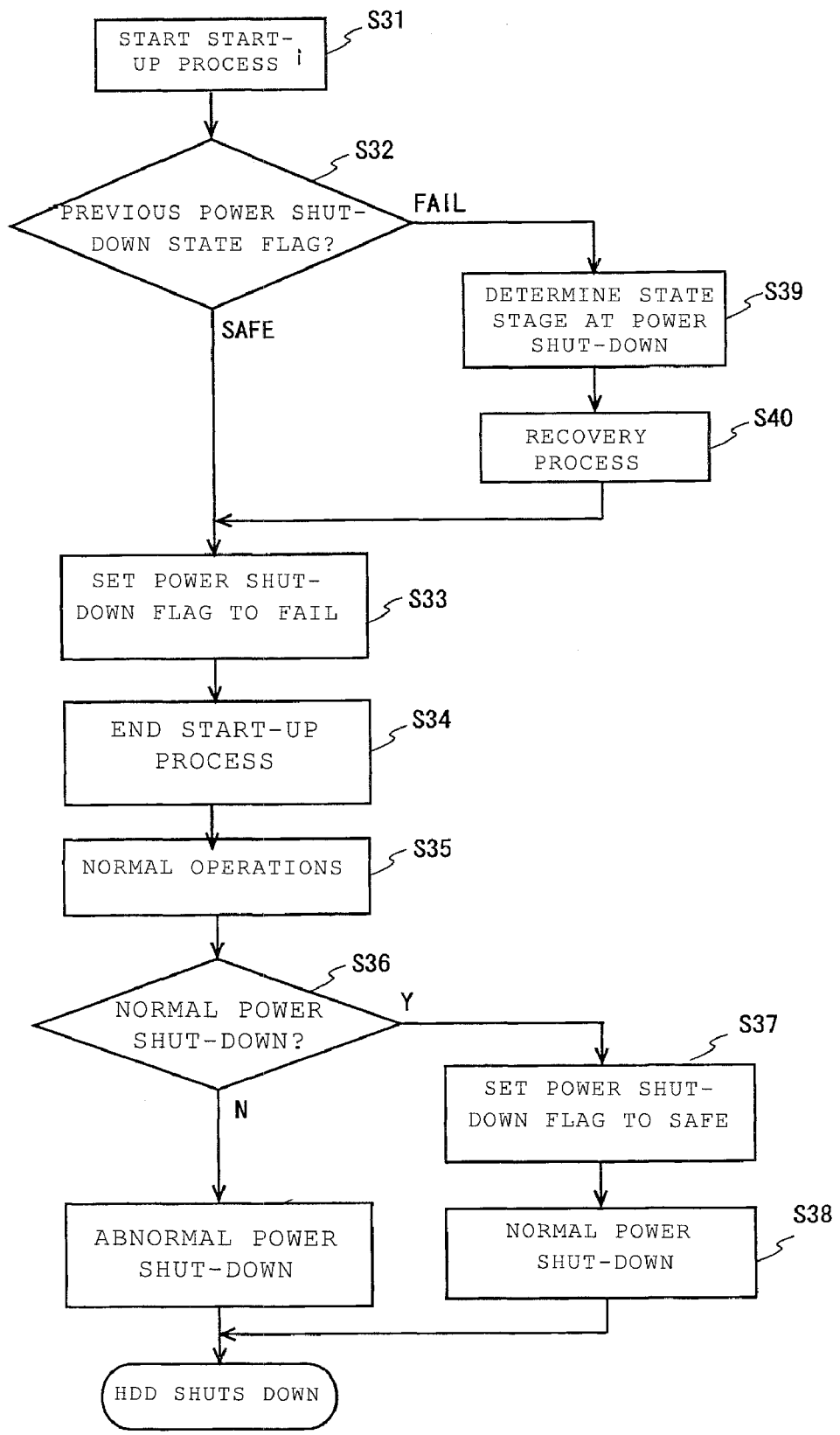
FIG. 9 is a flowchart schematically depicting a process from a start-up of an HDD to a power shut-down, in accordance with an embodiment of the present invention.

With reference now to FIG. 9, in accordance with an embodiment of the present invention, before describing each state stage shown in FIG. 8, the process from a start-up to a power shut-down of the HDD 1 is next described. At S31, upon a start-up of the HDD 1, the HDC/MPU 23 starts a start-up process. In the start-up process, after the HDC/MPU 23 performs normal operations such as operation check and parameter setting, at S32, the HDC/MPU 23 refers to the power shut-down state flag to identify the conditions of the previous power shut-down. The power shut-down state flag is kept in an area in a non-volatile memory area, such as the EEPROM, or the magnetic-recording disk 11. If the power shut-down state flag indicates a normal power shut-down (SAFE-branch after S32), at S33, the HDC/MPU 23 sets the power shut-down state flag to FAIL; and, at S34, ends the start-up process. After the start-up, at S35, the HDC/MPU 23 of the HDD 1 performs normal operations. When the power is shut-down after that, at S36, the HDC/MPU 23 determines whether the power shut-down is a normal power shut-down, or an accidental power-shut down. If the power shut-down is a normal power shut-down (Y-branch after S36), at S37, the HDC/MPU 23 sets the power shut-down state flag to SAFE, and, at S38, performs normal power shut-down process to stop the HDD 1.

With further reference to FIG. 9, in accordance with an embodiment of the present invention, if the power shut-down is abnormal (N-branch after S36), the HDD 1 shuts down without change. The power shut-down state flag remains FAIL. In a start-up process, if the power shut-down state flag indicates an abnormal power shut-down (FAIL-branch after S32), at S39, the HDC/MPU 23 determines the state stage at the power shut-down, and, at S40, performs a recovery process in accordance with the state stage. Upon recovery, the HDC/MPU 23 performs operation S33 and the following operations. In this way, the power shut-down state flag is set to FAIL at the start-up and is set to SAFE before the HDD 1 shuts down normally. Accordingly, if an accidental power shut-down happens during the operation of the HDD 1, the power shut-down state flag remains FAIL and the HDC/MPU 23 possesses information of the previous abnormal shut-down at the time of the next start-up. As described with reference to the flowchart of FIG. 9, the HDC/MPU 23 performs a recovery process depending on the state stage at the abnormal power shut-down.

With reference now to FIG. 8 and further reference to FIGS. 5 and 7, in accordance with an embodiment of the present invention, referring to the state stages, a determination method of the state stage, and details of the recovery process corresponding to the state stages is next described. As shown in FIG. 5, when the small-sized data sector controller 233 saves a write command to a non-volatile memory area, at S241 of FIG. 7, the state changes from stage 13 into stage 01. In stage 01, the power shut-down state flag indicates an abnormal end. In addition, the head data sector and the end data sector are the data before being rewritten. The data sectors of the backup data contain data of the previous process. Since it is the process after a start-up, the power shut-down state flag indicates an abnormal end as explained with reference to FIG. 9. This is the same in the other state stages. In addition, since data have not been written to data sectors 111*a* to 111*f*, the head data sector and the end data sectors contain the data before being rewritten. Since a backup has not been started, the backup start flag and the backup end flag indicate the completion of the previous process.

With further reference to FIGS. 5 and 8, in accordance with an embodiment of the present invention, a rewrite of the backup start flag is started to change the state from stage 01 into stage 02. Since the rewrite of the backup start flag has not been completed, as shown in FIG. 8, the data sector containing the backup start flag is unreadable. The other conditions are the same as the stage 01. When the rewrite of the backup start flag is completed, the state changes from stage 02 to stage 03. In the stage 03, the backup start flag indicates the state of under execution and the other conditions are the same as the stage 02. In the stage 03, the data in data sectors 111*a* and 111*f* are written to data sectors 111*h* and 111*i*. When the user data write is completed and a rewrite of the backup end flag is started, the state changes from the stage 03 to stage 04. Since the rewrite of the backup end flag has not been completed, the data sector containing the backup end flag is unreadable. The other conditions are the same as the stage 03. When the rewrite of the backup end flag has been completed, the state changes from the stage 04 to stage 05. In the stage 05, the backup start flag indicates the state of under execution and the other conditions are the same as the stage 04.

With further reference to FIGS. 5 and 8, in accordance with an embodiment of the present invention, a data rewrite in the head data sector 111*a* is started and the state changes from the stage 05 to stage 06. Since the rewrite of the head data sector 111*a* has not been completed, the head data sector 111*a* is unreadable in the stage 06. The other conditions are the same as the stage 05. When the rewrite of the head data sector 111*a* has been completed, the state changes from the stage 06 to stage 07. In the stage 07, the data in the head data sector 111*a* are rewritten new data. The other conditions are the same as the stage 06. In the stage 07, the data sectors 111*b* to 111*e* are rewritten. A data rewrite in the end data sector 111*f* is started and the state changes from the stage 07 to stage 08. Since the rewrite of the end data sector 111*f* has not been completed, the end data sector 111*f* is unreadable in the stage 08. The other conditions are the same as the stage 07. When the rewrite of the end data sector 111*f* has been completed, the state changes from the stage 08 to stage 09. In the stage 09, the data in the end data sector 111*f* are rewritten new data. The other conditions are the same as the stage 08.

With further reference to FIGS. 5 and 8, in accordance with an embodiment of the present invention, a rewrite of the backup start flag is started to change the state from stage 09 into stage 10. This is the rewrite of the backup start flag from execution to completion. Since the rewrite of the backup start flag has not been completed, the data sector containing the backup start flag is unreadable. The other conditions are the same as the stage 09. When the rewrite of the backup start flag is completed, the state changes from stage 10 to stage 11. In the stage 11, the backup start flag indicates the state of completion and the other conditions are the same as the stage 10. When the rewrite of the backup end flag is started, the state changes from the stage 11 to stage 12. Since the rewrite of the backup end flag has not been completed, the data sector containing the backup end flag is unreadable. The other conditions are the same as the stage 11. When the rewrite of the backup end flag has been completed, the state changes from the stage 12 to stage 13. In the stage 13, the backup end flag indicates the state of completion and the other conditions are the same as the stage 12.

With further reference to FIG. 9, in accordance with an embodiment of the present invention, the HDC/MPU 23 performs a recovery process in a start-up process after an abnormal power shut-down, at operations S39 and S40 of FIG. 9. The recovery process is controlled and executed by the HDC/MPU 23, which functions as a recovery processor. In this process, the HDC/MPU 23 is required to identify which state stage the power shut-down happened at. The HDC/MPU 23 identifies the state stage at the power shut-down using the state flag of the backup area, the backup data, and the user data in the data sectors subjected to the backup. In this way, using the backup data and the original user data to be backed up to identify the state stage leads to reduction of the number of necessary state flags. In the above-described embodiment of the present invention, necessary state flags include two: the backup start flag, and the backup end flag. The previous power shut-down state flag indicates the presence, or absence, of abnormality in a power shut-down, and does not indicate the state of write process at an abnormal power shut-down.

With further reference to FIG. 8, in accordance with an embodiment of the present invention, the state stage in a write process including a backup process can be identified by four points: the data in the head data sector subjected to the backup, the data in the end data sector, the backup start flag, and the backup end flag. The HDC/MPU 23 identifies the state stage at an abnormal power shut-down by these four points and performs the recovery process for the stage. Specifically, the HDC/MPU 23 obtains a write command saved in a non-volatile memory area to determine the target sectors, which are the data sectors in the rewrite area, of the interrupted write process. In the example described in the discussion of FIG. 5, those are the data sectors 111a to 111f. The HDC/MPU 23 determines the data sectors where boundaries do not agree with those of large-sized data sectors from the address area specified by the write command. If both the head data sector and the end data sector agree with large-sized data sectors in their boundaries, the recovery process is not needed. If either, or both of, the head data sector and the end data sector do not agree with large-sized data sectors in their boundaries, a recovery process is performed with respect to the data sectors, or data sector.

With further reference to FIG. 8, in accordance with an embodiment of the present invention, as is next described, it is assumed the boundaries in both the head data sector and the end data sector do not agree with those of the large-sized data sectors. The HDC/MPU 23 retrieves the data in data sectors 111a and 111f, and retrieves the data sectors 111h and 111i in the backup area. Although the HDC/MPU 23 may not be able to retrieve either the data sector 111a or 111f, if so, the state stage at a power shut-down is stage 06 or stage 08. Comparing the data sectors 111a and 111f in the rewrite area with data sectors 111h and 111i in the backup area, the HDC/MPU 23 can determine whether the data sectors 111a and 111f are new data, or old data, before the rewrite. If the data in the rewrite area are identical to the data in the backup area, the data in the rewrite area is old data; and if the data in the rewrite area are not identical to the data in the backup area, data in the rewrite area is new data. If either the data sector 111h or 111i in the backup area cannot be retrieved accurately, the state is the stage 03 and the data in the data sectors in the rewrite area are old data. The HDC/MPU 23 can read the backup start flag and the backup end flag from the data sectors 111g and 111j in the backup area. If the HDC/MPU 23 cannot accurately read either one of the data sectors, that is one of the conditions for determining the state stage as shown in FIG. 8.

With further reference to FIG. 8, in accordance with an embodiment of the present invention, a recovery process corresponding to each state stage is next described. If the rewrite of the both data sectors 111a and 111f in the rewrite area have not been started yet and the data are the previous ones, for example, state stage 01 to state stage 05, the HDC/MPU 23 sets the flags so that the previous power shut-down flag will indicate SAFE and both the backup start flag and the backup end flag will indicate completion. Namely, the flags are set to the state of the state stage 00. User data in the rewrite area, or the backup area, are not processed. Data renewal in the rewrite area is restarted upon a command from the host 51. If the write command indicating the rewrite area cannot be correctly read, the HDC/MPU 23 performs the same processing. If either the data sector 111a or 111f in the rewrite area contains new data, or is unreadable, and the backup start flag and backup end flag indicate execution, for example, state stage 06 to state stage 08, the HDC/MPU 23 writes back the backup data in the backup area into the data sectors 111a and 111f in the rewrite area to make the data in the data sectors 111a and 111f into the old data before the renewal. Moreover, the HDC/MPU 23 sets the flags to the state of the state stage 00. The data renewal in the rewrite area restarts upon a command from the host 51. If both of the data sectors 111a and 111f in the rewrite area have been rewritten and contain new data, for example, the state stages 09 to 13, the HDC/MPU 23 sets the flags to the state of the state stage 00. Data renewal in the rewrite area has been completed.

In accordance with an embodiment of the present invention, an example in which the flags and backup data are stored in areas of the EEPROM 25, which is a semiconductor non-volatile memory, instead of the magnetic-recording disk 11 is next described. For reduction of components and cost, in one embodiment of the present invention, flags and backup data are stored on the magnetic-recording disk 11. In writing to the magnetic-recording disk 11, however, time is expended to spin up the magnetic-recording disk 11 and to perform a seek operation. A write operation to the EEPROM 25 does not consume such time. Accordingly, storing data for the recovery process to the EEPROM 25 achieves swifter processing. The basic process is the same as the example using the magnetic-recording disk 11. There is no substantial difference in the logical configuration in the HDC/MPU 23. Similar to the example of FIG. 5, the EEPROM 25 stores the head data sector and the end data sectors with different boundaries into the non-volatile memory areas, which are a first and a second non-volatile memory areas. In addition, the EEPROM 25 stores the write command, the backup start flag, and the backup end flag into the associated non-volatile memory areas, which are a fifth, a third, and a fourth non-volatile memory areas. The power shut-down state flag is saved to the EEPROM 25. Unlike the magnetic-recording disk 11, the HDC/MPU 23 can simultaneously store a plurality of sets of data into the EEPROM 25. For example, while the HDC/MPU 23 performs a seek operation to the target track for the user data specified by a write command, the HDC/MPU 23 can store the write command and the backup start flag into the EEPROM 25. Storing the backup start flag means rewriting the backup start flag. If the write command and the backup start flag are simultaneously written into the EEPROM 25, the state stage 01, which has been described with reference to FIG. 8, does not exist.

As set forth above, certain embodiments of the present invention have been described by way of example without limitation thereto. A person skilled in the art can easily modify, add, or convert the components in the above embodiment within the scope of the present invention. The present invention may be applied to disk drives other than the HDDs. To determine the rewrite area for a recovery process, it is efficient to save the write command, but other information to determine the rewrite area may be saved. Furthermore, the information may be stored to the same sector where the state flag is stored.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for writing data to a disk of a disk drive that is configured to access said disk based on large-sized data sectors and that includes a host interface configured to support both large-sized data sectors and small-sized data sectors, said method comprising:
   receiving a write command;
   identifying a data sector size of said write command;
   determining whether a beginning and an end of a rewrite area specified by said write command agree with boundaries of large-sized data sectors on said disk if said data sector size of said write command is a data sector size of a small-sized data sector;
   reading a head data sector that includes said beginning of said rewrite area from said disk, and making a backup of said head data sector in a first non-volatile memory area if said beginning of said rewrite area does not agree with a boundary of a large-sized data sector on said disk;
   reading a tail data sector that includes said end of said rewrite area from said disk, and making a backup of said tail data sector in a second non-volatile memory area if said end of said rewrite area does not agree with said boundary of said large-sized data sector on said disk;
   setting data in a third non-volatile memory area indicating a start of backups before starting said backups into said first non-volatile memory area and said second non-volatile memory area;
   setting data in a fourth non-volatile memory area indicating a completion of said backups after completing said backups into said first non-volatile memory area and said second non-volatile memory area;
   starting a rewrite of said rewrite area after completing said backups into said first non-volatile memory area and said second non-volatile memory area;
   determining a state stage by using said data in said third non-volatile memory area indicating said start of said backups, said data in said fourth non-volatile memory area indicating said completion of said backups, data in said first and said second non-volatile memory areas, and data in said head data sector and said tail data sector in said rewrite area if a power shut-down occurs during execution of a process of said write command; and
   executing a recovery process in accordance with said determined state stage.

2. The method of claim 1, further comprising:
   changing said data indicating said start of said backups and said completion of said backups so as to indicate completion of said rewrite in said rewrite area after said completion of said rewrite.

3. The method of claim 1, wherein said first, said second, said third and said fourth non-volatile memory areas are areas selected from the group consisting of areas on said magnetic-recording disk and areas in a semiconductor non-volatile memory.

4. The method of claim 1, further comprising:
   storing said write command into a fifth non-volatile memory area; and
   determining a write area by referring to said stored write command in determining said state stage.

5. The method of claim 1, wherein said first, said second, said third and said fourth non-volatile memory areas are data sectors on a same track of said disk.

6. The method of claim 5, wherein said rewrite area is a data sector on said same track of said disk.

7. The method of claim 5, wherein said data indicating said start of said backup, said data in said first non-volatile memory area, said data in said second non-volatile memory area, and said data indicating said completion of said backup are sequentially stored into data sectors in order of: first, said data indicating said start of said backup; second, said data in said first non-volatile memory area; third, said data in said second non-volatile memory area; and fourth, said data indicating said completion of said backup.

8. The method of claim 7, wherein said data sectors for storing said data indicating said start of said backup, said data in said first non-volatile memory area, said data in said second non-volatile memory area, and said data indicating said completion of said backup are consecutive.

9. A disk drive that is configured to access a disk based on large-sized data sectors and that includes a host interface configured to support both large-sized data sectors and small-sized data sectors, said disk drive comprising:
   a data size detector configured to receive a write command and to detect a data sector size of said write command;
   a determining part configured to determine whether a beginning and an end of a rewrite area specified by said write command agree with boundaries of large-sized data sectors on said disk if said data sector size of said write command is a data sector size of a small-sized data sector;
   a first non-volatile memory area configured to make a backup of a head data sector that includes said beginning of said rewrite area read from said disk, if said beginning of a rewrite area does not agree with a boundary of a large-sized data sector on said disk;
   a second non-volatile memory area configured to make a backup of a tail data sector that includes said end of said rewrite area read from said disk, if said end of a rewrite area does not agree with said boundary of said large-sized data sector on said disk;
   a third non-volatile memory area configured to set data indicating a start of backups before starting said backups into said first non-volatile memory area and said second non-volatile memory area;
   a fourth non-volatile memory area configured to set data indicating a completion of said backups after completing said backups into said first non-volatile memory area and said second non-volatile memory area;

a head configured to start a rewrite of said rewrite area after completion of said backups into said first non-volatile memory area and said second non-volatile memory area; and a recovery processor configured to determine a state stage by using said data in said third non-volatile memory area indicating said start of said backups, said data in said fourth non-volatile memory area indicating said completion of said backups, data in said first and said second non-volatile memory areas, and data in said head data sector and said tail data sector in said rewrite area if a power shut-down occurs during execution of a process of said write command, and configured to execute a recovery process in accordance with said determined state stage.

10. The disk drive of claim 9, wherein said data indicating said start of said backups and said completion of said backups are changed so as to indicate completion of said rewrite in said rewrite area after said completion of said rewrite.

11. The disk drive of claim 9, wherein said first, said second, said third and said fourth non-volatile memory areas are areas selected from said group consisting of areas on said magnetic-recording disk and areas in a semiconductor non-volatile memory.

12. The disk drive of claim 9, further comprising:
a fifth non-volatile memory area configured to store said write command;
wherein said recovery processor is configured to determine a write area by referring to said stored write command in determining said state stage.

13. The disk drive of claim 9, wherein said first, said second, said third and said fourth non-volatile memory areas are data sectors on a same track of said disk.

14. The disk drive of claim 13, wherein said rewrite area is a data sector on said same track of said disk.

15. The disk drive of claim 13, wherein said data indicating said start of said backup, said data in said first non-volatile memory area, said data in said second non-volatile memory area, and said data indicating said completion of said backup are sequentially stored into data sectors in order of: first, said data indicating said start of said backup; second, said data in said first non-volatile memory area; third, said data in said second non-volatile memory area; and fourth, said data indicating said completion of said backup.

16. The disk drive of claim 15, wherein said data sectors for storing said data indicating said start of said backup, said data in said first non-volatile memory area, said data in said second non-volatile memory area, and said data indicating said completion of said backup are consecutive.

* * * * *